(12) United States Patent
Li et al.

(10) Patent No.: US 10,563,785 B2
(45) Date of Patent: Feb. 18, 2020

(54) EROSION PREVENTION STRUCTURE FOR SEALING SURFACE OF VALVE

(71) Applicants: Cenwenda Li, Chengdu (CN); Wei Li, Chengdu (CN)

(72) Inventors: Cenwenda Li, Chengdu (CN); Wei Li, Chengdu (CN)

( * ) Notice: Subject to any disclaimer, the term of this patent is extended or adjusted under 35 U.S.C. 154(b) by 112 days.

(21) Appl. No.: 15/744,897

(22) PCT Filed: Nov. 14, 2016

(86) PCT No.: PCT/CN2016/105621
§ 371 (c)(1),
(2) Date: Jan. 15, 2018

(87) PCT Pub. No.: WO2018/058753
PCT Pub. Date: Apr. 5, 2018

(65) Prior Publication Data
US 2019/0011055 A1    Jan. 10, 2019

(30) Foreign Application Priority Data

Sep. 29, 2016   (CN) .......................... 2016 1 0863038

(51) Int. Cl.
| | |
|---|---|
| *F16K 25/04* | (2006.01) |
| *F16K 1/226* | (2006.01) |
| *F16K 47/08* | (2006.01) |
| *F16K 1/24* | (2006.01) |

(Continued)

(52) U.S. Cl.
CPC ............ *F16K 25/04* (2013.01); *F16K 1/2261* (2013.01); *F16K 1/24* (2013.01); *F16K 1/32* (2013.01); *F16K 47/08* (2013.01); *F16K 31/445* (2013.01)

(58) Field of Classification Search
USPC .......................................... 251/296
See application file for complete search history.

(56) References Cited

U.S. PATENT DOCUMENTS

| | | | |
|---|---|---|---|
| 4,815,698 A * | 3/1989 | Palmer ................... | F16K 1/482 251/176 |
| 5,618,026 A | 4/1997 | Geyer | |

(Continued)

FOREIGN PATENT DOCUMENTS

| | | |
|---|---|---|
| CN | 202074047 U | 12/2011 |
| CN | 103244748 A | 8/2013 |
| CN | 204226669 U | 3/2015 |

(Continued)

*Primary Examiner* — John Fox
(74) *Attorney, Agent, or Firm* — Gokalp Bayramoglu

(57) ABSTRACT

An erosion prevention structure for a sealing surface of a valve includes a valve body, a valve seat, a valve core, a valve sleeve and a valve rod. A valve seat mounting hole is provided in the valve body and located between a medium outlet and a cavity; the valve seat is arranged in the valve seat mounting hole; the top surface of the valve seat is provided with an annular table; the outside surface of the annular table is a sealing surface A, wherein an included angle is formed between the sealing surface A and a horizontal surface; an annular flange is arranged at the bottom of the valve core and located at the outer side of the valve core; the inside surface of the annular flange is a sealing surface B, wherein an included angle is formed between the sealing surface B and a horizontal surface.

4 Claims, 5 Drawing Sheets

(51) Int. Cl.
 *F16K 1/32* (2006.01)
 *F16K 31/44* (2006.01)

(56) References Cited

U.S. PATENT DOCUMENTS

| | | | | |
|---|---|---|---|---|
| 5,964,248 A | * | 10/1999 | Enarson | F01D 17/143 |
| | | | | 137/625.37 |
| 2004/0031527 A1 | * | 2/2004 | Stratton | F16K 1/42 |
| | | | | 137/625.37 |

FOREIGN PATENT DOCUMENTS

| CN | 204739235 U | 11/2015 |
|---|---|---|
| CN | 206036257 U | 3/2017 |

* cited by examiner

--Prior Art--

EROSION PREVENTION STRUCTURE FOR SEALING SURFACE OF VALVE

CROSS REFERENCE TO RELATED APPLICATIONS

This application is the national phase entry of International Application No. PCT/CN2016/105621, filed on Nov. 14, 2016, which claims priority from the Chinese patent application no. 201610863038.0 filed on Sep. 29, 2016, the entire contents of which are incorporated herein by reference.

TECHNICAL FIELD

The present invention relates to the technical field of regulating valve sealing structures, and in particular to an erosion prevention structure for a sealing surface of a valve.

BACKGROUND

At present, the sealing requirement of regulating valves chosen by most of thermal power plants and petrochemical companies to the closure of the valves is not high, i.e., allows a small leakage of the valves. However, for a regulating valve that is required to be in a working condition of tight closure, the valve manufacturers at home and abroad have not found effective measures and methods to protect and prevent a sealing surface from being damaged, both of which are to directly use the outer side of the lower end surface of a valve core and an inclined surface of a valve seat as sealing surfaces. FIG. 5 is a sealing structure of an existing regulating valve. In the valve adjustment process, a medium continuously erodes the sealing surface at the end part of the valve core via throttle holes of a valve sleeve to produce non-uniform erosion to the sealing surface at the end part of the valve core. When the valve is closed, there is a gap between the eroded portion of the sealing surface of the valve core and the sealing surface of the valve seat.

The existing regulating valve hereby has the following defects: (1) when the valve regulates the medium, the front end of the valve core takes the effects of changing a throttling area and regulating medium parameters; the sealing surface at the front end of the valve core always suffers from a severe impact from the high-speed throttling medium, and therefore the sealing surface of the valve core will be damaged by erosion after being used for a long time; however, the erosion damage of the sealing surface is non-uniform, and therefore, the valve is closed, a gap will be formed between the eroded portion and the original sealing surface of the valve seat, resulting in internal leakage. (2) Due to internal leakage and large pressure difference at this time, the valve core and the sealing surface of the valve seat will be severely damaged by erosion at the same time, and from then on the valve cannot be sealed. (3) As a throttling regulation portion is damaged, the valve cannot be regulated properly, thereby affecting the normal operation of the system. (4) As a leakage occurs to the valve in a very short period of time, and with the use time increases, the leakage amount also increases. This situation has been continued for a minor repair time of the crew, in order to treat the valve, which will bring great economic losses to users (loss of high temperature and high pressure medium, and increase of fed water to a boiler), and therefore, the losses will far exceed the own value of the valve. (5) Since the structure of the chosen valve is not suitable for such conditions, even if new spare parts are replaced, it is also impossible to completely avoid such a thing; and the valve will be subject to great damage, which will increase the repair amount of the valve, the workload for the replacement of the valve and spare parts and other costs.

SUMMARY

The present invention aims to overcome the defects of the prior art and provide an erosion prevention structure for a sealing surface of a valve, which is not only capable of regulating the flow of a medium safely and reliably, but also ensuring that the valve still has high regulating precision, tight closure and greatly prolonged service life after being used for a long time.

The objective of the present invention is realized by the following technical solution: an erosion prevention structure for a sealing surface of a valve comprises a valve body, a valve seat, a valve core, a valve sleeve and a valve rod, wherein the valve body is internally provided with a cavity; the left end and the lower end of the valve body are provided with a medium inlet and a medium outlet respectively; a valve seat mounting hole is provided in the valve body and located between the medium outlet and the cavity; the valve seat is arranged in the valve seat mounting hole; the top surface of the valve seat is provided with an annular table; the outside surface of the annular tablet is a sealing A, wherein an included angle is formed between the sealing surface A and a horizontal surface; the valve sleeve which penetrates through the cavity from top to bottom is also arranged in the valve body; the lower end surface of the valve sleeve is fixed to the outer edge of the valve seat; a plurality of throttle holes are uniformly distributed on a cylindrical surface of the valve sleeve and located at the lower end of the valve sleeve; the valve core is arranged in the valve sleeve; the outer wall of the valve core is in contact with the inner wall of the valve sleeve; an annular flange is arranged at the bottom of the valve core and located at the outer side of the valve core; the inside surface of the annular flange is a sealing surface B, wherein an included angle is formed between the sealing surface B and a horizontal surface; both the sealing surface B and the sealing surface A are annular, and an angular difference between the sealing B and the sealing A is 2 to 5 degrees; the valve rod is arranged in the valve sleeve and located above the valve core; the valve rod is connected with the valve core.

The upper surface of the valve seat is provided with a hard alloy layer by overlaying.

The lower surface of the valve core is provided with a hard alloy layer by overlaying.

The valve rod is flexibly connected with the valve core.

The present invention has the following advantages: (1) the problems that the internal leakage occurs after the regulating valve is used for a period of time and the leakage amount increases with the increase of the time are thoroughly solved. (2) The requirement on a working condition in which the regulating valve can be tightly closed after being used for a long time, and meanwhile the service life of the valve is prolonged significantly, the maintenance and repair amounts of the valve are greatly reduced, and the loss generated by medium leakage and the cost for the replacement of the valve and spare parts are avoided. (3) The erosion prevention structure of the present invention can be widely used in very harsh occasions (such as a recirculation minimum flow regulating valve of a boiler feed pump, a high and low pressure bypass regulating valve of a turbine, a water regulating valve of a high pressure differential reheater, etc.), completely achieves the performance require-

DETAILED DESCRIPTION OF THE EMBODIMENTS

The present invention will be further described as below in conjunction with the drawings. The protection scope of the present invention is not limited to the following content.

Figure 1:
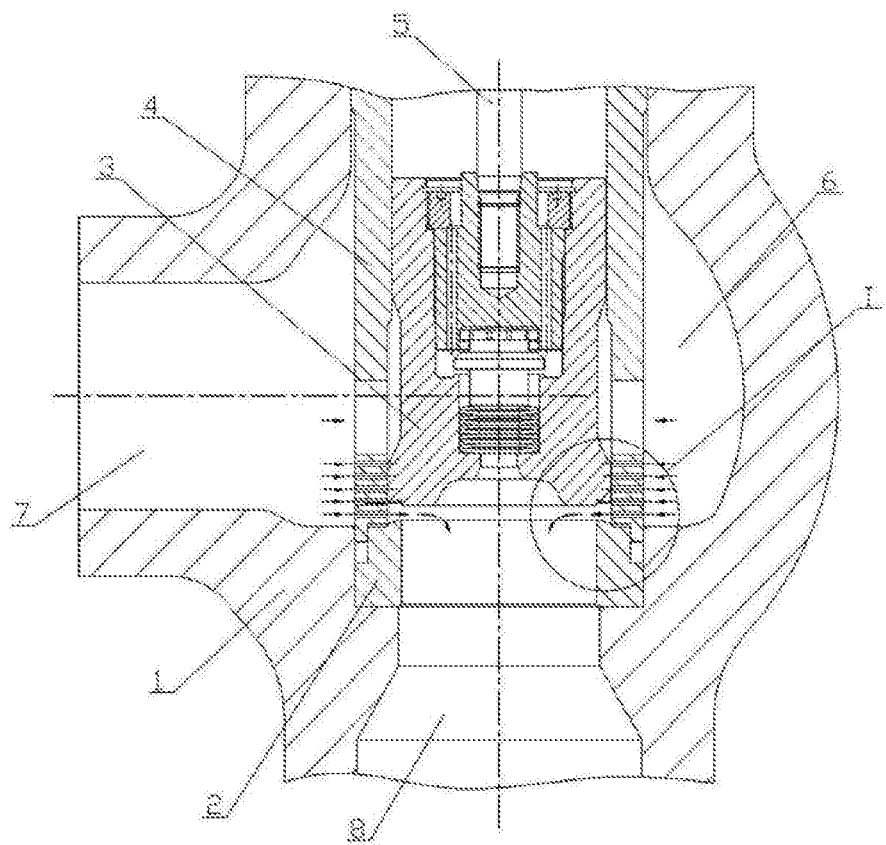
FIG. 1 is a schematic structural drawing when a valve of the present invention is in an open state.
Figure 2:
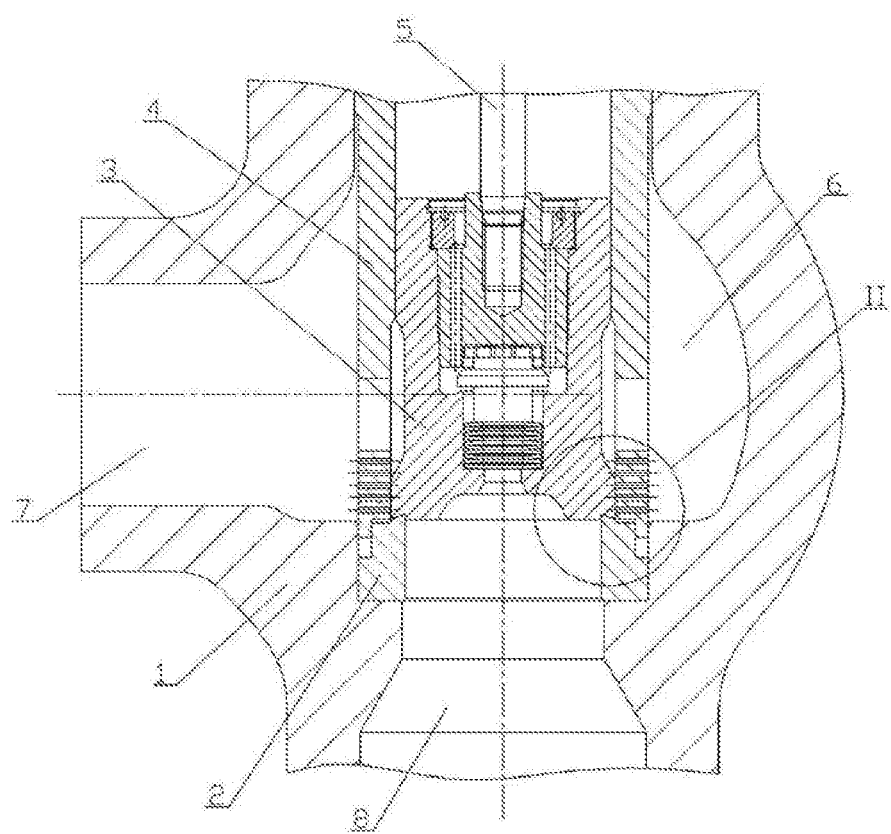
FIG. 2 is a schematic structural drawing when the valve of the present invention is in a closed state.
Figure 3:
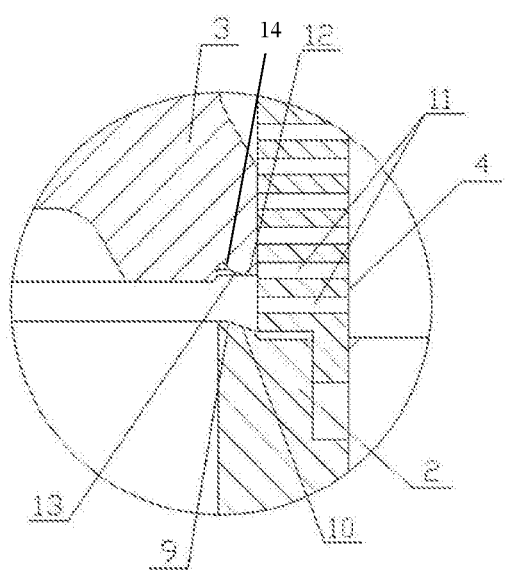
FIG. 3 is a partially enlarged view of a portion I of FIG. 1.
Figure 4:
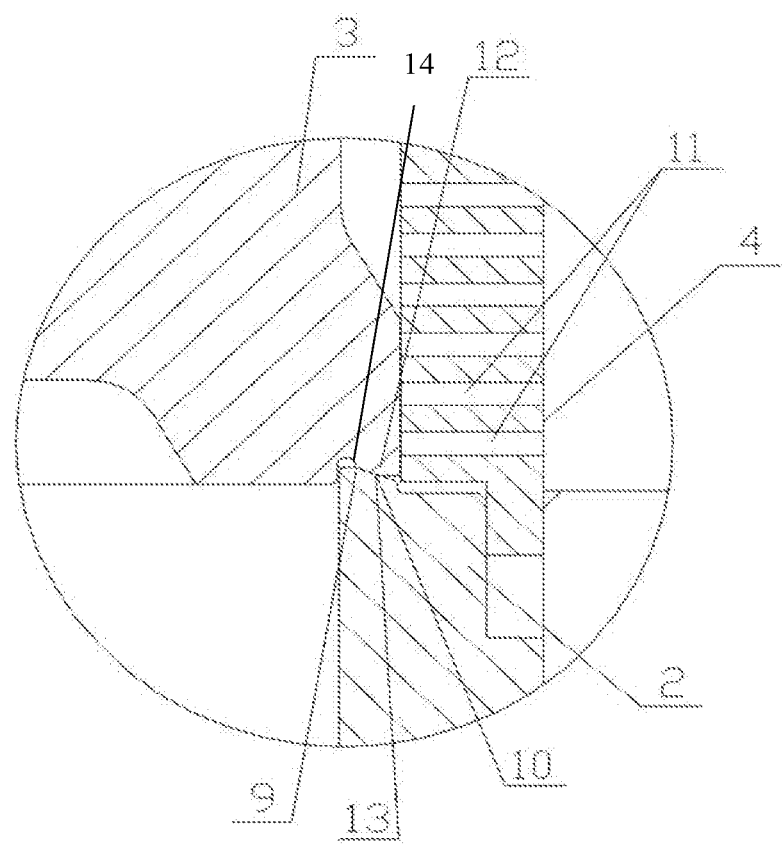
FIG. 4 is a partially enlarged view of a portion II of FIG. 2.
Figure 5:
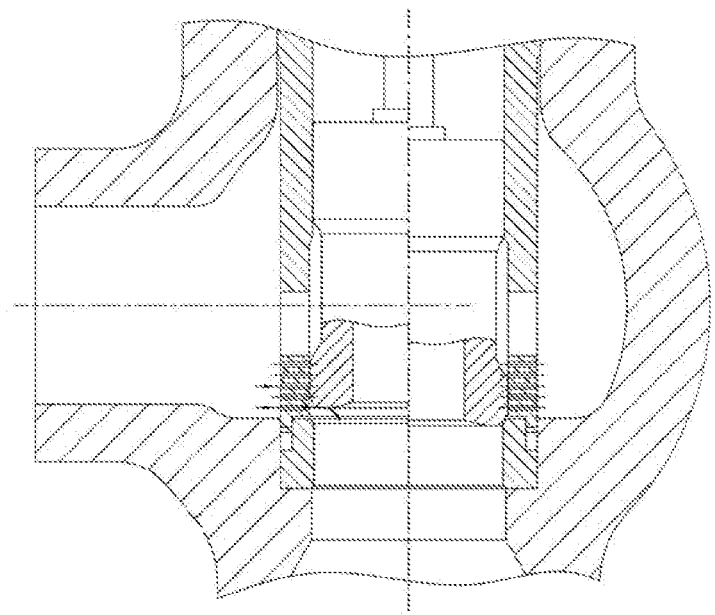
FIG. 5 is a schematic structural drawing of the existing regulating valve;
in drawings, the reference signs represent the following components: 1—valve body; 2—valve seat; 3—valve core; 4—valve sleeve; 5—valve rod; 6—cavity; 7—medium inlet; 8—medium outlet; 9—annular table; 10—sealing surface A; 11—throttle hole; 12—annular flange; 13—sealing surface B; 14—concave surface.

As shown in FIGS. 1 to 4, an erosion prevention structure for a sealing surface of a valve comprises a valve body 1, a valve seat 2, a valve core 3, a valve sleeve 4 and a valve rod 5, wherein the valve body 1 is internally provided with a cavity 6; the left end and the lower end of the valve body 1 are provided with a medium inlet 7 and a medium outlet 8 respectively; a valve seat mounting hole is provided in the valve body 1 and located between the medium outlet 8 and the cavity 6; the valve seat 2 is arranged in the valve seat mounting hole; the top surface of the valve seat 2 is provided with an annular table 9; the outside surface of the annular table 9 is a sealing surface A 10, wherein an included angle is formed between the sealing surface A10 and a horizontal surface; the valve sleeve 4 which penetrates through the cavity 6 from top to bottom is also arranged in the valve body 1; the lower end surface of the valve sleeve 4 is fixed to the outer edge of the valve seat 2; a plurality of throttle holes 11 are uniformly distributed on a cylindrical surface of the valve sleeve 4 and located at the lower end of the valve sleeve 4; the valve core 3 is arranged in the valve sleeve 4; the outer wall of the valve core 3 is in contact with the inner wall of the valve seat 4; an annular flange 12 is arranged at the bottom of the valve core 3 and located at the outer side of the valve core 3; the inside surface of the annular flange 12 is a sealing surface B, wherein an included angle is formed between the sealing surface B13 and a horizontal surface; both the sealing surface B13 and the sealing surface A10 are annular, and an angular difference between the sealing surface B13 and the sealing surface A10 are 2 to 5 degrees. When the valve is closed, all the throttle holes 11 are intercepted by the valve core 3, while a tip formed by the annular flange 12 and the sealing surface B13 is in tight contact with the sealing surface A10 to form a linear seal reliable in sealing, thereby preventing medium leakage. The bottom of the valve core 3 and the bottom of the sealing surface B 13 form a concave surface.

The upper surface of the valve seat 2 is provided with a hard alloy layer by overlaying; the lower surface of the valve core 3 is provided with a hard alloy layer by overlaying. The valve rod 5 is arranged in the valve sleeve 4 and located above the valve core 3, and the valve rod 5 is flexibly connected with the valve core 3, so as to ensure that the valve core 3 can be freely aligned when the valve is closed, such that the sealing surface B13 is tightly combined with the sealing surface A10 of the valve seat 2, thereby ensuring that the valve is tightly sealed.

The working process of the present invention is as follows: when the regulating valve regulates the flow of a medium and the valve core 3 is moved upwards, the number of the connected throttle holes 11 increases, and most of medium flows out via the throttle holes 11, an inner pore of the valve sleeve 4, the valve seat 2 and the medium outlet 8 in sequence; when the valve core 3 is moved downwards, the number of the connected throttle holes 11 decreases, and only a small amount of medium flows out via the throttle holes 11, the inner pore of the valve sleeve 4, the valve seat 2 and the medium outlet 8 in sequence, thereby regulating medium parameters. Under the two regulating states, since the annular flange 12 outside the valve core 3 takes an effect of preventing a throttling medium from eroding the sealing surfaces, the medium always cannot impact the sealing surface B13 of the valve core 3, and therefore the sealing surface B13 of the valve core 3 cannot be damaged by washout erosion or cavitation erosion when the valve regulates the medium, without forming a gap between the valve seat 2 and the valve core 3. When tight closure can be realized when the regulating valve is closed, and meanwhile, since the sealing surface B13 is effectively protected against damage, the service life of the regulating valve is prolonged significantly, and meanwhile the regulating precision of the regulating valve is ensured.

The foregoing contents are only preferred embodiments of the present invention and it is to be understood that the present invention is not limited to the forms disclosed herein and should not be construed as an exclusion of other embodiments and may be used in various other combinations, modifications and environments and can be modified within the scope of the invention as described herein by the techniques or knowledge of the above teachings or related fields. Changes and modifications made by those skilled in the art without departing from the spirit and scope of the present invention should fall within the scope of the appended claims.

The invention claimed is:
1. An erosion prevention structure for a sealing surface of a valve, comprising: a valve body, a valve seat, a valve core, a valve sleeve and a valve rod, wherein
the valve body is internally provided with a cavity; a left end and a lower end of the valve body are provided with a medium inlet and a medium outlet respectively; a valve seat mounting hole is provided in the valve body and located between the medium outlet and the cavity;
the valve seat is arranged in the valve seat mounting hole; a top surface of the valve seat is provided with an annular table; an outside surface of the annular table is a first sealing surface, wherein an included angle is formed between the first sealing surface and a horizontal surface;
the valve sleeve penetrating through the cavity from top to bottom is arranged in the valve body; a lower end surface of the valve sleeve is fixed to an outer edge of the valve seat; a plurality of throttle holes are uniformly distributed on a cylindrical surface of the valve sleeve and located at a lower end of the valve sleeve;

the valve core is arranged in the valve sleeve; an outer wall of the valve core is in contact with an inner wall of the valve sleeve; an annular flange is arranged at a bottom of the valve core and located at an outer side of the valve core; an inside surface of the annular flange is a second sealing surface, wherein a second included angle is formed between the second sealing surface and the horizontal surface; both the second sealing surface and the first sealing surface are annular, and an angular difference between the second sealing surface and the first sealing surface is 2 to 5 degrees;

the valve rod is arranged in the valve sleeve and located above the valve core; and the valve rod is connected with the valve core; and the bottom of the valve core and a bottom of the second sealing surface form a concave surface.

2. The erosion prevention structure for the sealing surface of the valve according to claim 1, wherein the top surface of the valve seat is provided with a hard alloy layer by overlaying.

3. The erosion prevention structure for the sealing surface of the valve according to claim 1, wherein the bottom of the valve core is provided with a hard alloy layer by overlaying.

4. The erosion prevention structure for the sealing surface of the valve according to claim 1, wherein the valve rod is flexibly connected with the valve core.

* * * * *